Patented July 12, 1927.

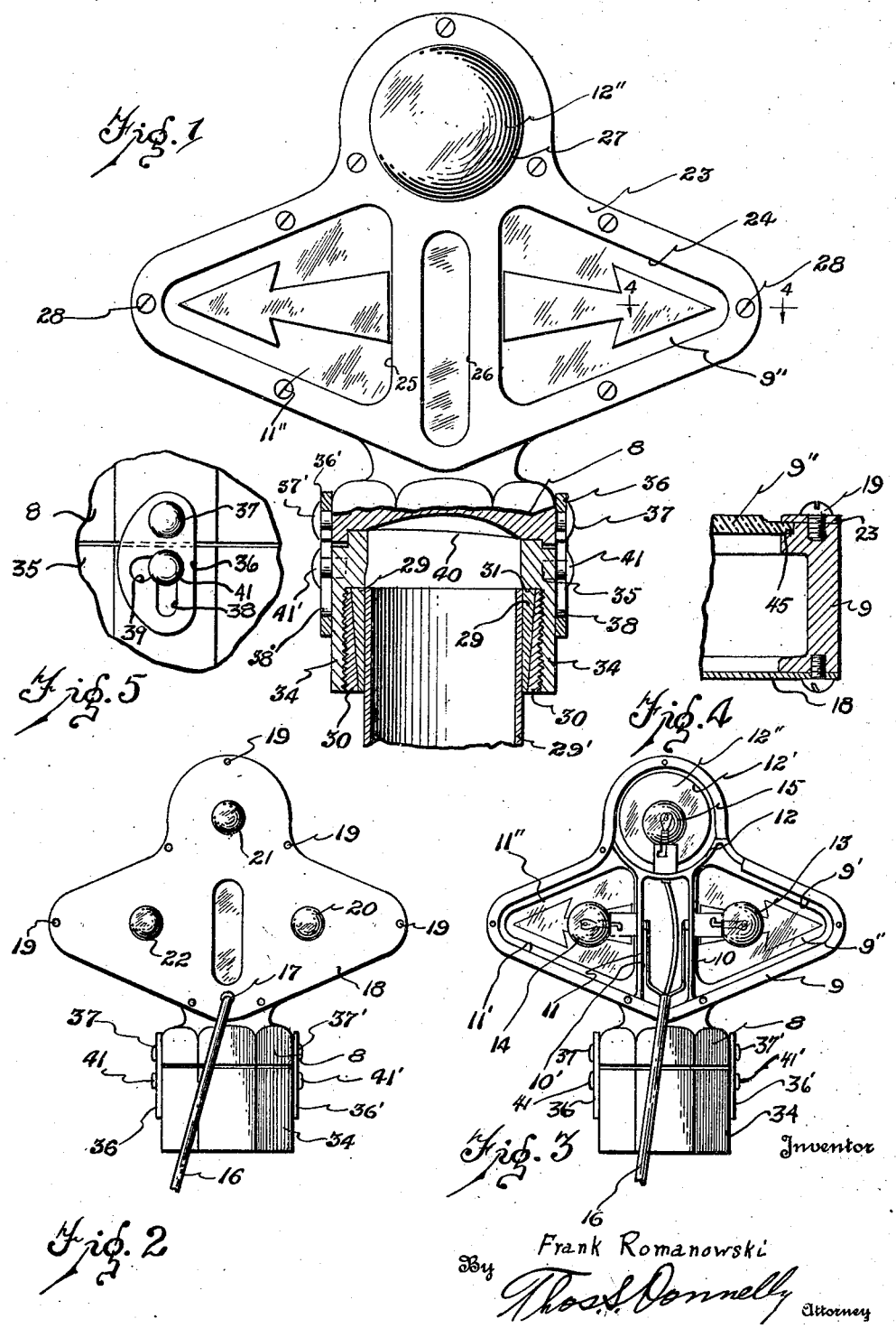

1,635,436

UNITED STATES PATENT OFFICE.

FRANK ROMANOWSKI, OF DETROIT, MICHIGAN.

VEHICLE SIGNAL.

Application filed November 24, 1924. Serial No. 751,811.

My invention relates to a new and useful improvement in a vehicle signal adapted for use by the operator of the vehicle for indicating to pedestrians or the operators of following vehicles his intentions in directing and operating the vehicle in which he is riding. The advantages of the use of such a signaling means is believed to be evident, when it is known that the operator of the vehicle may operate the signaling device without in any great degree impairing his efficiency as a driver of his vehicle, or absorbing his attention so that the proper care may not be exercised in driving the vehicle.

An object of the invention is the provision of a vehicle signal of this class which will be simple in structure economical of manufacture and highly efficient in use.

Another object of the invention is the provision of a vehicle signal of this class having means for attaching the same to the radiator neck without damaging or otherwise injuring or mutilating the neck of the radiator.

Another object of this invention is the provision of a signal of this class which may be mounted on the radiator and serve as a cap therefor.

Another object of the invention is the provision of a signal of this class which is provided with means for mounting the same on a radiator and serving as a cap therefor and so arranged as to be permanently in place when desired.

Other objects will appear hereinafter.

The invention consists in the combination and arrangement of parts hereinafter described and claimed.

The invention will be best understood from a reference to the accompanying drawings which form a part of this specification and in which, Fig. 1 is a front elevational view of the invention mounted on a radiator and showing parts broken away and parts in section, Fig. 2 is a rear elevational view, Fig. 3 is a rear elevational view with the rear wall removed, Fig. 4 is a fragmentary sectional view taken on substantially line 4—4 of Fig. 1, and, Fig. 5 is a fragmentary side elevational view of the invention.

The invention in its preferred form comprises a base 8, integral with which, and projecting therefrom, is a frame 9, having the partition wall 10 formed thereon. The partition walls described herein are preferably made integral with the frame, the frame and the walls all being formed from a single casting. However, it will be apparent that the essentials of the invention may be utilized in a stamping as well as in the casting and I do not wish to limit myself to a casting. Partition walls 11 and 12 are also provided to divide the frame into separate sections which form when the front and back are mounted on the frame, separate compartments 9', 10', 11' and 12', the partition walls being provided along the inner edges with recesses 45 upon which is seated a closure 9", 10", 11", and 12". Mounted in the compartments 9', 11', and 12', is an electric light 13, 14, and 15 respectively, for illuminating the compartments. The compartment 10' is also used for suitable registering means for indicating the temperature of the interior of the radiator which is positioned in this compartment. Suitable wiring 16 is positioned in the house thus formed, an opening 17 being formed in the rear wall 18 which is fastened to the frame 9 by means of suitable screws 19. The rear wall is provided with an opening 20 in which is positioned a suitable lens for permitting the light from the bulb 14 to shine therethrough to indicate to the driver of the vehicle that the bulb is lit. A similar opening 21 is provided with a lens for the compartment 12'. A similar opening 22 is also provided with a suitable lens for the compartment 9'. The closures 9" and 11" are provided with indicating means pointing to the sides of the vehicle with which used so as to indicate the direction of turn of the vehicle about to be made by the operator of the vehicle. In the form shown, arrows have been used for this purpose, although other indicating means may be mounted on the closures such as printed words or the like.

A front plate 23 having openings 24, 25, 26, and 27 formed to correspond to the various compartments so as to retain the closures of these compartments in position and permit the radiation of light therefrom or therethrough, is secured to the frame by suitable screws 28. The closure used for the compartment 12' may be a bulb of suitable coloring, such as blue or green or the like.

In the drawings, I have shown the invention mounted upon the neck of a radiator, but it will be apparent from the description of the operation of the device that it may be equally well mounted upon a standard supported upon the rear fender of a motor vehicle or from some convenient place in the rear of the vehicle. When the device is mounted on the radiator neck of a vehicle, as shown in the drawings, and also in the rear of the vehicle in some convenient place, a means will be afforded for indicating the intentions of the driver of the vehicle to pedestrians in front of the vehicle and to the drivers of following vehicles.

A split ring 29 is mounted on the neck 29' of the radiator as shown in Figure 1. This ring tapers toward its lower end. Embracing the ring 29 is a peripherally threaded ring 30, which is uninterrupted. The inner surface of the ring 30 tapers toward its upper end. In mounting these rings on the radiator neck, the ring 30 is placed thereon, and the ring 29 is then positioned on the neck of the radiator and thrust into engagement with the inner surface of the ring 30. A collar 35 is provided with an extended flange 34 which provides a sleeve having its inner surface interiorly threaded for threading on the ring 30. The collar 35 is provided with a shoulder 31 which engages against the upper surface of the ring 29, so that upon threading of the collar 35 thereon, the ring 29 is wedged between the ring 30 and the periphery of the radiator neck 29', to securely bind these parts in an assembled relation on the radiator neck 29'. Keepers 36 and 36' are mounted on sides of the base 8 by means of studs or bolts 37 and 37' which are secured to the base 8. Each of these keepers 36 and 36' is provided respectively with an elongated slot 38 and 38' through which project studs 41 and 41' respectively, so as to retain the keepers in assembled relation to the collar 35. The slot 38 terminates at its upper end, in an angular slot to provide a binding joint for locking the base 8 on the collar 35. As shown in Figure 1, the upper surface 40 of the collar 35 is spirally inclined so that when the base 8 is rotated so as to engage the studs 41 and 41' in the angularly turned portion 39 of the slot, the collar and base will be securely locked in position relatively to each other.

When it is desired to fill the radiator, the base 8 may be rotated so as to disengage the studs 41 and 41' from the slots 39 and 39' respectively. The base 8 may then be raised from the collar 35 and tilted to permit the filling of the radiator.

The light in the compartment 12' would ordinarily be kept lighted at all times when driven in the night time, and a suitable switch is intended to be provided for this purpose in a position accessible to the driver of the vehicle.

When this frame is mounted on the rear of the vehicle, the compartment 12' may be used to indicate the intentions of the driver of the vehicle, to stop, in which case the switch operating the light on this compartment would be mounted and operated by the brake pedal in any well known manner. The lights in the compartments of 9' and 11' may be controlled by suitable switches, mounted on the steering wheel of the vehicle. I have not shown these specific methods of mounting these switches or their specific structure, as any well known type of switch may be used to suit the wishes of the operator.

It is thus seen that I have provided a vehicle signal combining the minimum of parts, one which is substantial in its structure, attractive in its appearance, and easily operated.

While I have illustrated and described the preferred form of structure, I do not wish to limit myself to the prescribed detail of structure shown, but desire to avail myself to such variations and modifications as shown within the scope of the appended claims.

Having thus described my invention, what I claim as new and desire to secure by Letters Patent is:

1. In a vehicle signal adapted for use with a vehicle having a radiator provided with a radiator spout, a mechanism for attaching the signal housing to said spout, comprising a pair of super-imposed collars adapted for mounting on said spout, said collars being wedge shaped and oppositely faced, one of said collars being exteriorly threaded; and supporting means adapted for threading on said exteriorly threaded collar, said exteriorly threaded collar being adapted for clamping the inner collar, in close engagement with said spout, upon the threading of said means thereon.

2. In a vehicle signal adapted for mounting on the neck of an automobile radiator with which used, a split collar wedge shaped in cross section, mounted on said neck, having the smaller end facing downwardly; a wedge shaped collar mounted on said split collar, having the wedge shaped upwardly, and the periphery threaded; and a separate member adapted for threading on said periphery for binding said collars in clamping engagement relatively, to each other, and for binding said split collar in clamping engagement with the neck of said radiator.

3. A fastening mechanism of the class described adapted for mounting on a cylindrical body comprising a split ring having its periphery tapered to one end mounted on said cylindrical body; a co-operating ring having its inner surface oppositively tapered; and means for moving said rings axially of each other for bringing the tapered end of each ring into closer relation to the opposite end of the other ring for clamping said split ring upon said cylindrical body.

4. In a fastening mechanism of the class described adapted for mounting on a cylindrical body; a split ring having its periphery tapered toward one end; a co-operating ring positioned about said split ring and having its inner surface tapered toward one end in the opposite direction to the taper of said split ring, the periphery of said co-operating ring being threaded; a threaded member adapted for threading on said co-operating ring and engaging the larger end of said split ring, said threaded member upon threading onto said co-operating ring serving to move said rings axially of each other and moving the larger ends of said rings into closer relation for clamping said split ring in close engagement on said cylindrical member.

In testimony whereof I have signed the foregoing specification.

FRANK ROMANOWSKI.